United States Patent [19]

Poncet et al.

[11] Patent Number: 4,620,831

[45] Date of Patent: Nov. 4, 1986

[54] INDUSTRIAL ROBOT GOVERNED BY A PROGRAMMABLE CONTROLLER

[75] Inventors: Jean-Pierre Poncet, St. Ismier; Michel Joumard, Grenoble; Robert Bonneton, Fontaine; Robert Chevaleyre, Domene, all of France

[73] Assignees: Merlin Gerin; Ateliers Bouvier; Allibert, all of Grenoble, France

[21] Appl. No.: 499,492

[22] Filed: May 31, 1983

[30] Foreign Application Priority Data

Jun. 7, 1982 [FR] France .................. 82 09992

[51] Int. Cl.[4] .............................................. B66C 23/02
[52] U.S. Cl. ............................. 414/744 A; 901/17; 901/21; 901/23; 901/25; 901/49
[58] Field of Search .......... 414/744 R, 744 A, 744 B, 414/744 C, 730, 7, 4; 901/14, 15, 17, 21, 23, 24, 25, 28, 30, 31, 49; 294/86 R, 86.4

[56] References Cited

U.S. PATENT DOCUMENTS

| | | | |
|---|---|---|---|
| 3,218,069 | 11/1965 | Halberschmidt | 414/744 B X |
| 4,293,268 | 10/1981 | Mink | 901/49 X |
| 4,428,710 | 1/1984 | Grisebach | 414/744 A X |

FOREIGN PATENT DOCUMENTS

| | | | |
|---|---|---|---|
| 2802738 | 1/1978 | Fed. Rep. of Germany . | |
| 2852821 | 4/1980 | Fed. Rep. of Germany | 901/15 |
| 2213212 | 10/1973 | France . | |
| 2440270 | 11/1978 | France . | |
| 2467060 | 10/1980 | France . | |
| 112789 | 1/1978 | Japan | 901/14 |
| 74720 | 8/1980 | Japan | 414/74 |

Primary Examiner—Donald W. Underwood.
Attorney, Agent, or Firm—Parkhurst & Oliff

[57] ABSTRACT

The invention concerns a kinematic system of an industrial robot and a sequential control system of its operating cycle.

The robot comprises a vertical spindle supporting a main rotating arm and a forearm fixed to a gripping component. A first vertical transfer jack is provided at the end of the forearm. Arms are mounted via bearings on a loose spindle in a link and can swivel, driven by servo-motors in a horizontal plane so as to form a kinematic system functioning in cylindrical coordinates. The servo-motors are programmed to drive the gripping component through a linear trajectory at the beginning of the cycle. A releasable couping system with memory device is provided for the tool-holder. The controller control system is arranged to ensure the transitory readjustment of each arm to a starting position.

5 Claims, 20 Drawing Figures

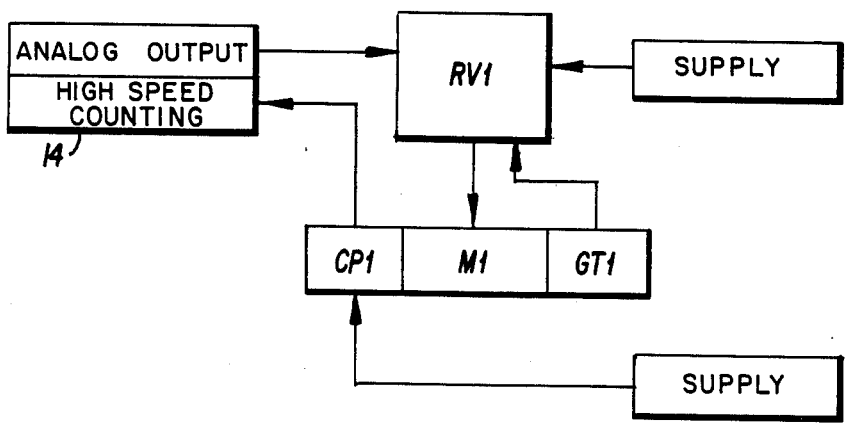
FIG. 6A
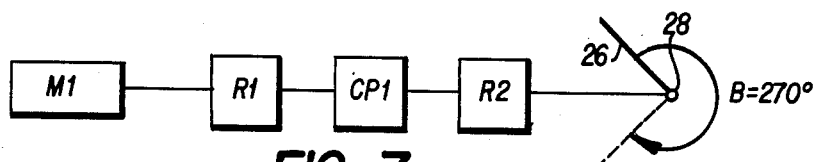
FIG. 7
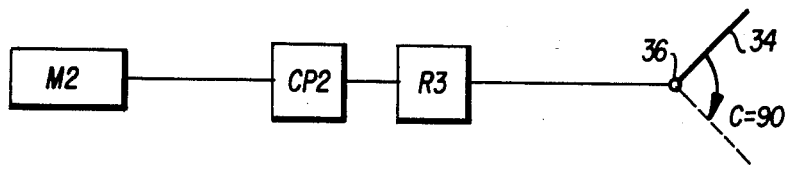
FIG. 8
FIG. 14a
POSITION DETECTOR SIGNAL
FIG. 14b
ZERO INDEX SIGNAL OF THE CODER
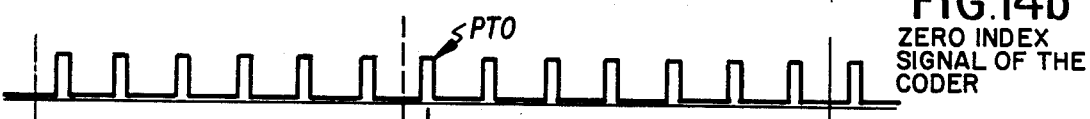
FIG. 14c
B=270°
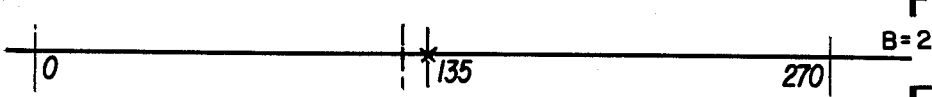
FIG. 14d
C=90°
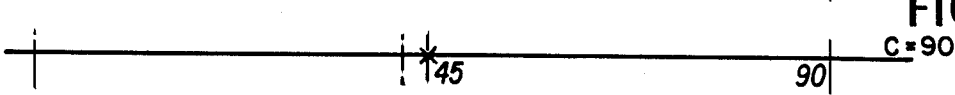
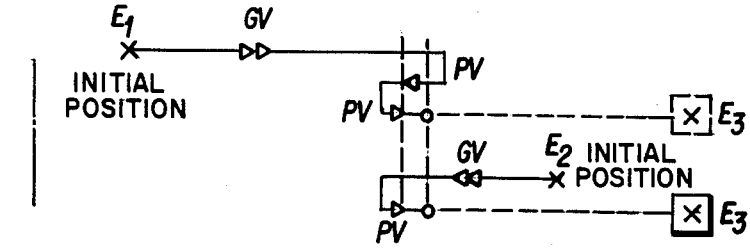
FIG. 14e
ARM READJUSTMENT KINEMATICS ACCORDING TO THE INITIAL POSITION

INDUSTRIAL ROBOT GOVERNED BY A PROGRAMMABLE CONTROLLER

BACKGROUND AND SUMMARY OF THE INVENTION

The invention concerns an industrial robot endowed with an articulated manipulator having a main rotating arm coupled mechanically to a forearm fixed to the gripping component and governed by a programmable controller that controls and monitors the robot's operating cycle.

The use of robots in the plastics processing industry to carry out various post-moulding and unloading operations is not new. The robots used are of the general purpose type with at least six degrees of freedom and are high performance robots. However, their kinematic structure and control system are complicated and the corresponding high cost weighs heavily in the amortization of capital expenditure.

The traditional manipulator systems used in the plastics processing industry have the following disadvantages:

automation is not total and consequently a work station must be maintained on the machine;

they are poorly adapted to short series (adjustment time);

additional machines must be adjoined for conditioning operations; and special adaptations must be provided in the case of particular stripping trajectories.

The industrial robot according to this invention is a middle term between manipulators and the general purpose robots with six degrees of freedom. It comprises a reliable and inexpensive system, with three axes, permitting all stripping and post-moulding functions.

The kinematic system of the manipulator according to the invention comprises:

a first means of vertical transfer provided between the gripping component and the free end of the forearm;

a swivel link between the main arm and the forearm composed of a vertical free-turning spindle onto which said arms are mounted by means of ball-bearings;

another vertical spindle supporting the main arm lying parallel to the free-turning spindle of the coupling in such a way that the two arms swivel round their respective spindles in a fixed horizontal plane to form a kinematic system functioning in cylindrical coordinates;

a first servo-motor driving the main arm;

a second servo-motor driving the forearm;

an auxiliary system to transmit the movement of the arms composed of a pair of gear-wheels fixed permanently at opposite ends of the loose spindle of the coupling, each co-operating with endless drive belts lying in the direction of the forearm and the main arm; and programming means co-operating with the servo-motors in order to co-ordinate the two servo-controlled rotating motions of the arms, so that the gripping component is driven through a linear trajectory at the beginning of the robot's operating cycle.

One of the particular features of the invention is that the belt corresponding to the forearm is wound between one of the gear-wheels of the auxiliary transmission system and a gear-wheel fixed to the first means of vertical transfer, and the belt corresponding to the main arm co-operates with the opposite gear-wheel on the spindle and another gear-wheel mounted coaxially with the supporting spindle, this last gear-wheel being either fast or adjustable in rotation in relation to the relative position of the rotating spindle of the main arm. The main arm is longer than the forearm and the angular travel B of the spindle supporting the main arm is greater than angular travel C of the forearm about the spindle of the coupling, the kinematic system being designed so that the circular trajectory $T_1$ of the swivel link during the angular travel B of the arm lies within the annular sector swept by the arms of the kinematic system, this sector being delimited by two concentric circular arcs $T_2$, $T_3$ centered on the spindle and constituting the trajectories of the means of vertical transfer for the extreme values of the angular travel C of the forearm.

Another feature of the invention is that the first means of vertical transfer comprises a jack and rod driving a piston moving in either direction of linear travel F between two preset upper and lower limiting positions, said jack rod being off-set radially in relation to the axis of the piston, so as to constitute an anti-rotation guide system. A releasable coupling system with a memory device is provided for the tool-holder in order to permit, on the one hand, the momentary disconnection of the tool from the tool-holder in the event of abnormal loads, and, on the other hand, the return of the tool to its start-of-work position.

Another feature of the invention is that the control system of each servo-motor includes an on-off position detector DP placed at a predetermined location on the angular travel B or C of the corresponding arm, and a transitory readjustment system of the said arm to a starting position when the first zero index signal (PTO) is detected following the change of status of the position detector DP.

BRIEF DESCRIPTION OF THE DRAWINGS

Other features and advantages will be more obvious from the following description of one embodiment of the invention, given as a non-exhaustive example, and illustrated in the attached drawings in which:

FIGS. 6a and 6b are block diagrams of the control system of each servo-motor;

FIGS. 7 and 8 show the diagram of the kinematic system driving the main arm and the forearm respectively;

FIGS. 14a to 14e and 15 illustrate respectively the kinematic system and the flowchart for the readjustment cycle of each arm.

DETAILED DESCRIPTION OF THE PREFERRED EMBODIMENT

Figure 2:
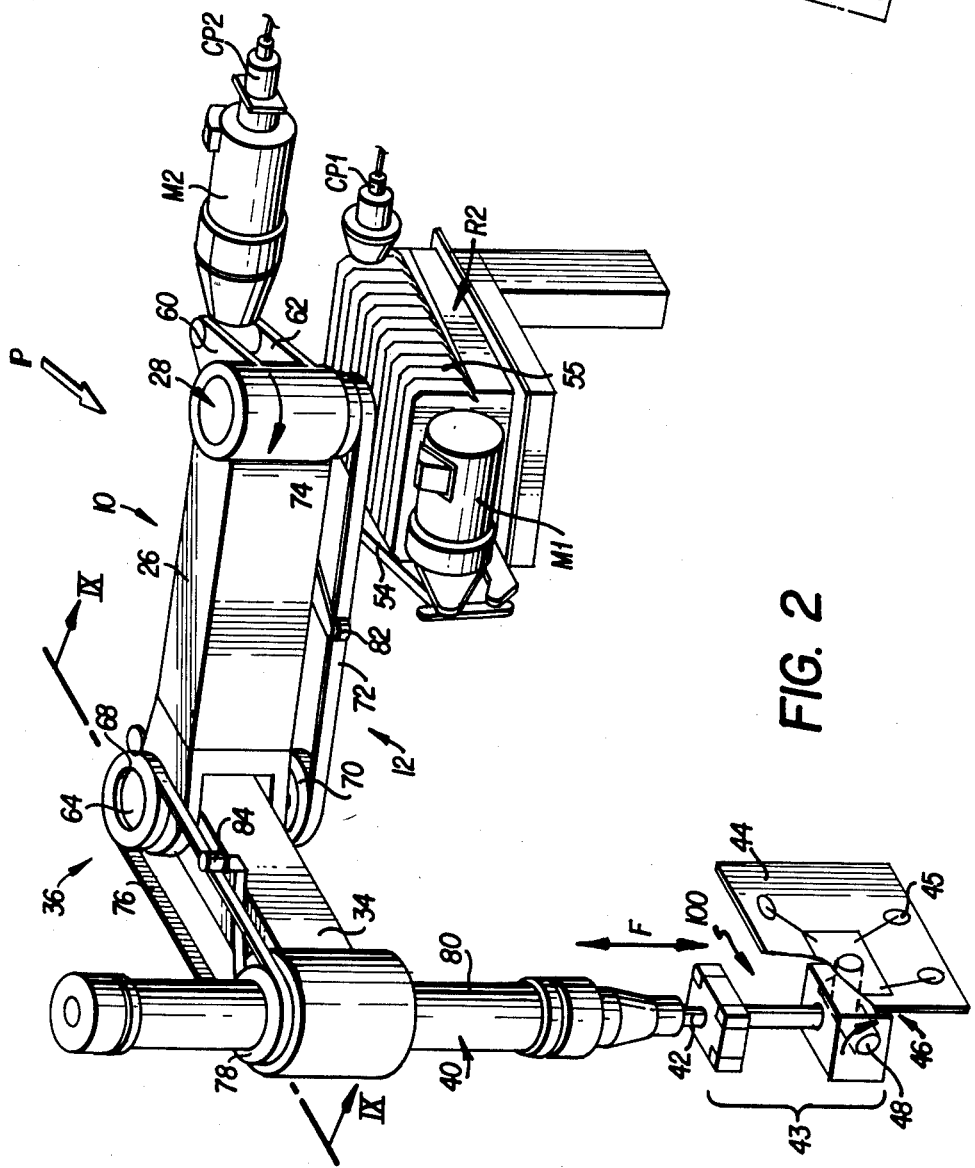
FIG. 2 is a perspective view of the articulated manipulator of the robot according to the invention.
Figure 4:
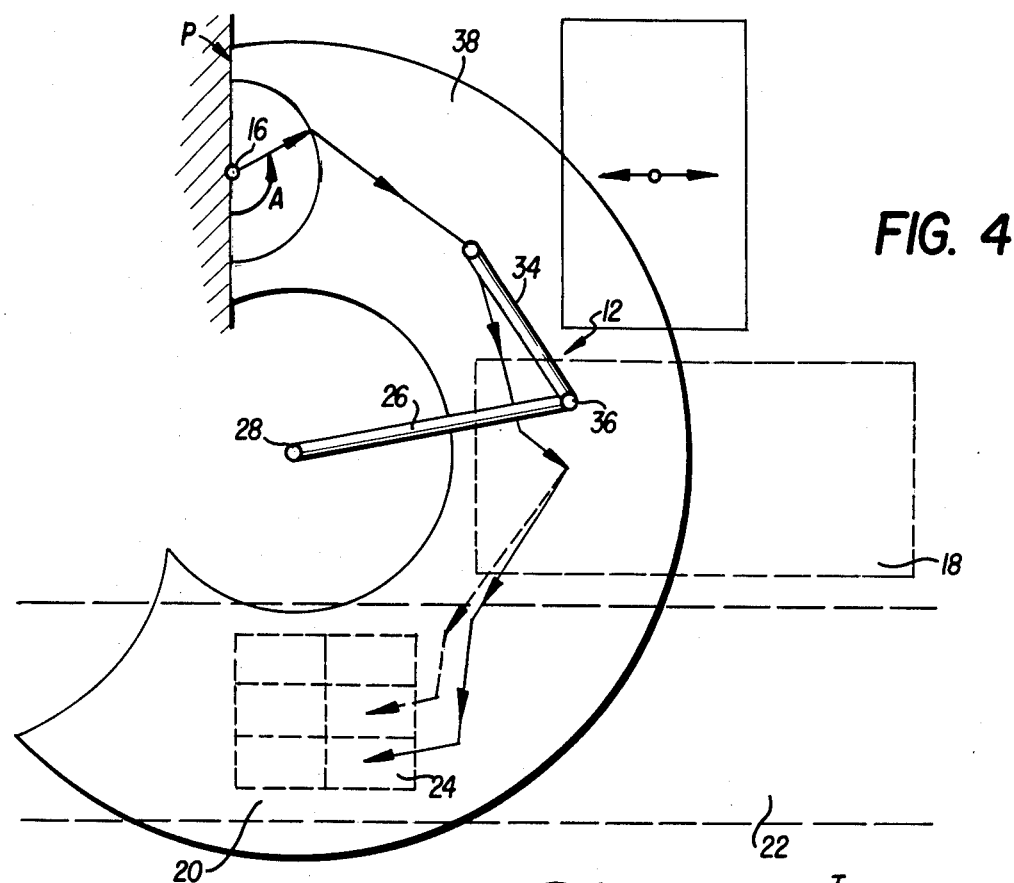
FIGS. 4 and 5 are schematic plan views of the robot illustrating the coordination of the rotating motions of the manipulator arms.

On the figures, a sequentially controlled industrial robot (10; FIG. 2) comprises an articulated manipulator (12) with multiple degrees of freedom, used in the plastic processing industry for post-moulding operations. The execution of the operating cycle is controlled by a programmable controller (14) and begins with the stripping and removal of the molded part from the mould starting from a pick-up point (16; FIG. 4). Removal takes place according to a linear trajectory with a predetermined travel forming a given angle A in relation to the stripping plate P (see FIG. 4). The cycle continues with a transfer operation to work area (18) where intermediate operations on the moulding, such as drilling, flash and sprue removal, are performed.

Palleting then takes place in an unloading area (20) situated on a conveyor (22), the end of the unloading phase coinciding with the positioning of the moulding on a receiver pallete (24). The robot (10) performs in cylindrical coordinates, the stripping of the part from the mould taking place by means of a limited translation followed by rotating motions to clear the part away.

Figure 1:
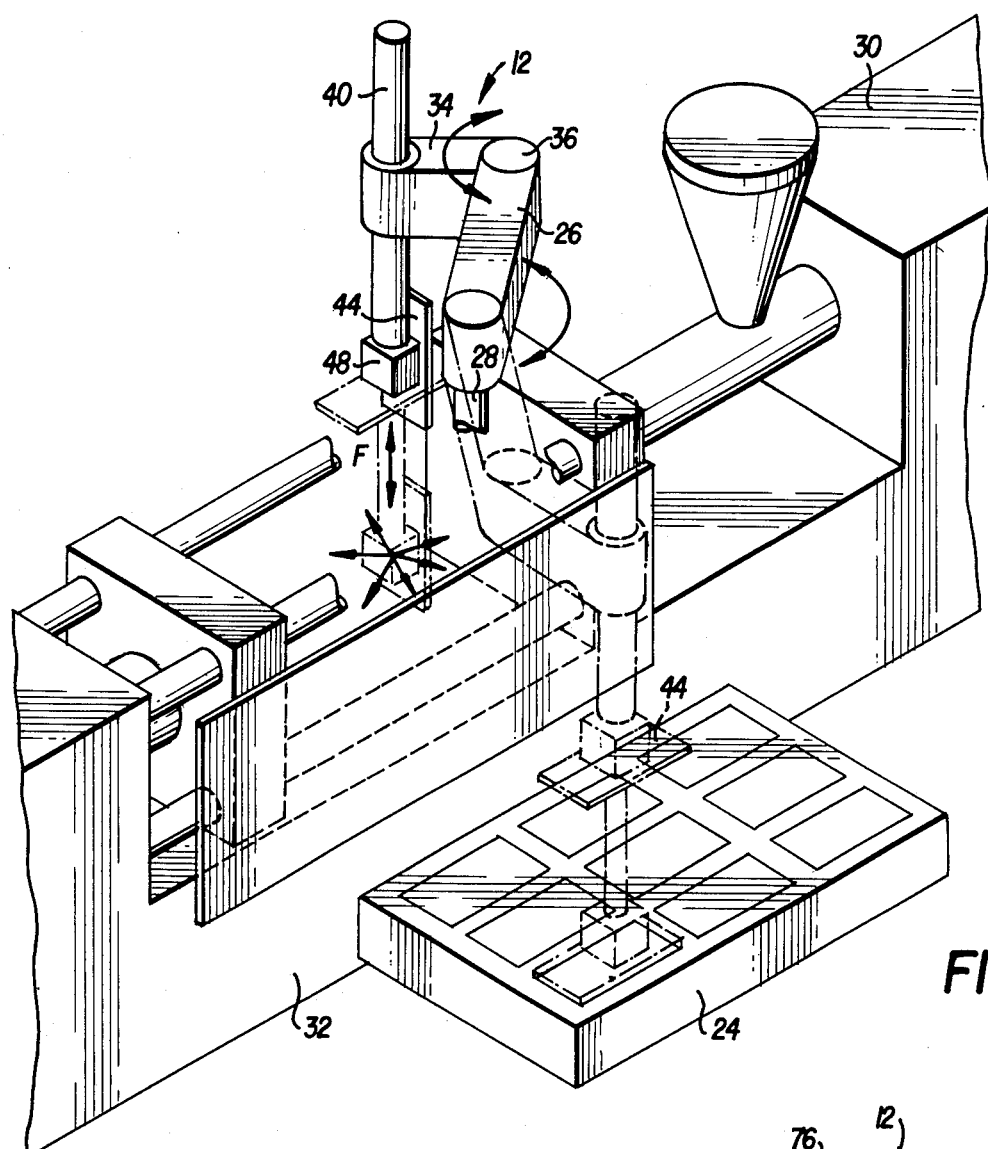
FIG. 1 is a schematic view in perspective of the industrial robot mounted on an injection press.

The articulated kinematic system of the manipulator (12; FIGS. 1 and 2) is fixed to the frame (30) of the press (32) and has a main arm (26) mounted to rotate on a supporting spindle (28). Opposite spindle (28), the main arm (26) is connected mechanically to a forearm (34) by means of a swivel link (36) lying parallel to supporting spindle (28) in a vertical plane perpendicular to frame (30). The two arms (26,34) of the articulated system are coplanar and move by pivoting in a fixed horizontal plane situated above the mould, sweeping an annular sector (38; FIG. 4). Arm (26) is longer than forearm (34). Opposite swivel link (36), forearm (34) carries a first vertical transfer jack (40, FIG. 2) having a drive rod (42) coupled to a tool-holder (43) co-operating with a pick-up tool (44). Pick-up tool (44) comprises a gripping component (45) composed, for example, of suckers to grip the moulded part. Drive rod (42) of jack (40) moves in either direction of linear travel F between two preadjusted limiting positions located at different levels, one at the top, one at the bottom. A second rotating drive jack (46) co-operates with the gripping component to achieve the vertical swing-over of the pick-up tool (44) about a horizontal spindle (48) of tool-holder (43). The swing of the pick-up tool (44) corresponds to that of a wrist articulated about spindle (48) between two extreme positions separated by an angle of 90°. The two jacks (40,46) are actuated pneumatically or electrically under the control of programmable controller 14.

The linear travel of the stripping operation is multi-directional (see FIGS. 1 and 4) in a horizontal plane and results from the coordination of the two coplanar servo-controlled rotating motions of main arm (26) and forearm (34). Coordination is controlled by programmable controller (14) in accordance with the value set for the stripping angle A. This angle depends on the intrinsic characteristics and parameters of the mould and the moulding and is written in the stripping cycle program of the robot.

Figure 6B:
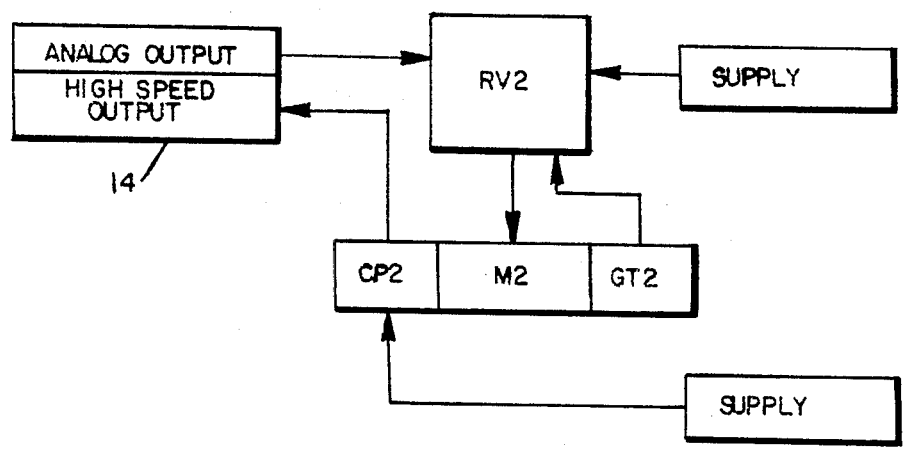
Figure 11:
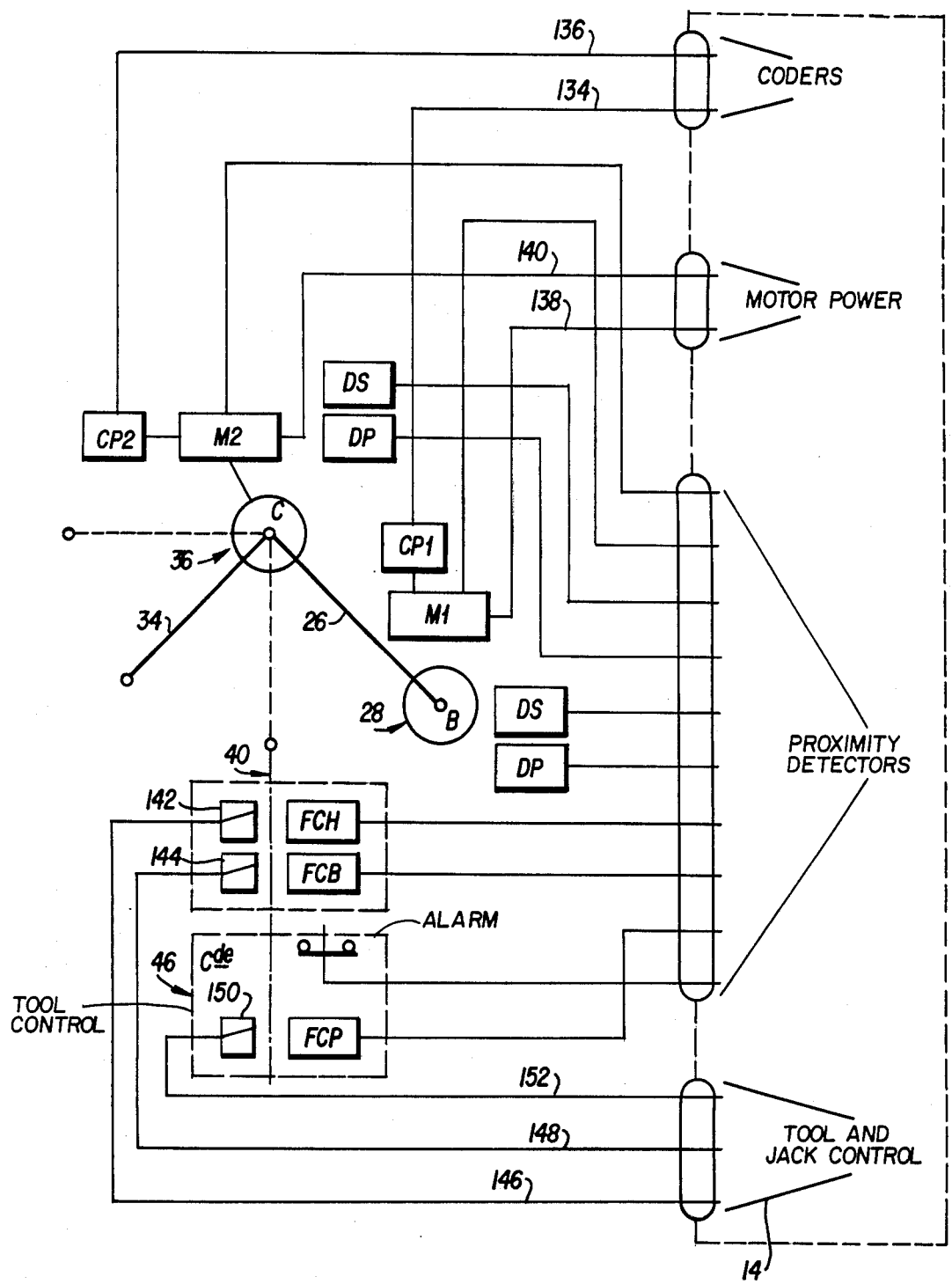
FIG. 11 is a diagram of the electrical connections between the robot and the programmable controller.

The rotating motions of main arm (26) and forearm (34) are generated by two servo-motors $M_1$, $M_2$ controlled by programmable controller (14; FIGS. 6a, 6b and 11), each servo-motor being equipped with an analog speed regulator, $RV_1$, $RV_2$ and an incremental coder of angular position, $CP_1$, $CP_2$ (see FIGS. 6a, 6b–8). The analog output from controller (14) transmits a set-point signal to speed regulator $RV_1$, $RV_2$, which generates the supply signal to servo-motor $M_1$, $M_2$, in accordance with the speed measured by a tachometric generator $GT_1$, $GT_2$. The servo-motor, $M_1$, $M_2$, angular position signal is delivered by the incremental coder $CP_1$, $CP_2$, to a high speed counting circuit of controller 14. Consequently, each servo-motor $M_1$ and $M_2$ has two servo-control loops, one for angular position and one for speed.

In FIGS. 2, 3, 5 and 7, the drive shaft of the first servo-motor $M_1$ is coupled mechanically to a first reducing drive gear $R_1$ comprised of two gear-wheels (50,52) co-operating with a notched drive belt (54). The large gear-wheel (52) of reducer $R_1$ is kinematically linked, by means of position coder $CP_1$, to a second reducing gear mechanism $R_2$ with a worm screw, co-operating with a drive wheel. Reducer $R_2$ is housed in fixed casing (55) under the vertical supporting spindle (28) so as to drive the rotation of spindle (28) and main arm (26) of the articulated system through a variable angular travel B of maximum amplitude 270 degrees.

Figure 3:
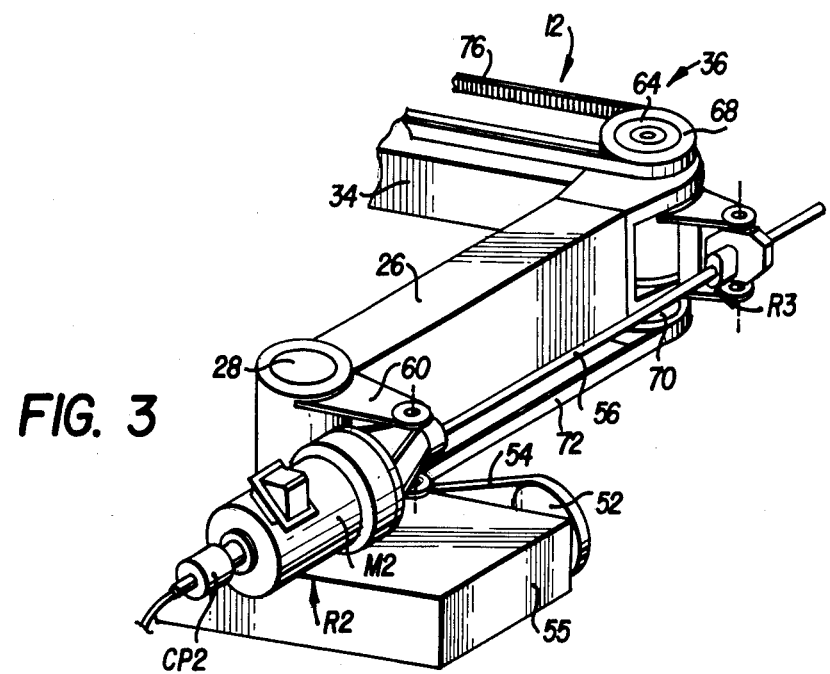
FIG. 3 is a part view in perspective of the robot along arrow P in FIG. 2.
Figure 5:
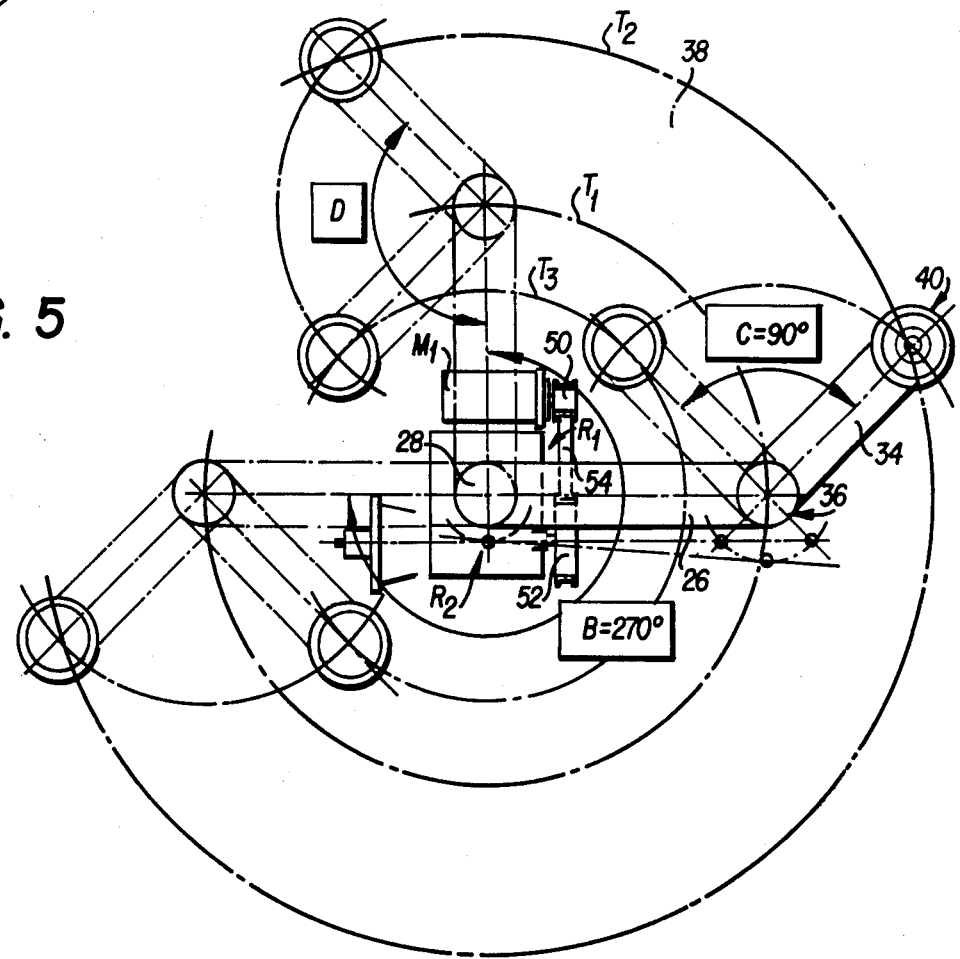

In FIGS. 3 and 8, the second servo-motor $M_2$, in conjunction with position coder $CP_2$, drives a third reducing gear mechanism $R_3$ composed of a ball-mounted drive screw (56) the length of which varies with the rotation of servo-motor $M_2$ and causes forearm (34) to pivot about swivel link (36). The angular swing C of forearm (34) about swivel (36) covers 90 degrees (FIG. 5). Servo-motor $M_2$ is held by two supporting lugs (60,62; FIG. 2) fixed on rotating spindle (28) of main arm (26). Drive screw (56) of reducer $R_3$ lies parallel to main arm (26) during angular travel B of supporting spindle (28).

Figure 9:
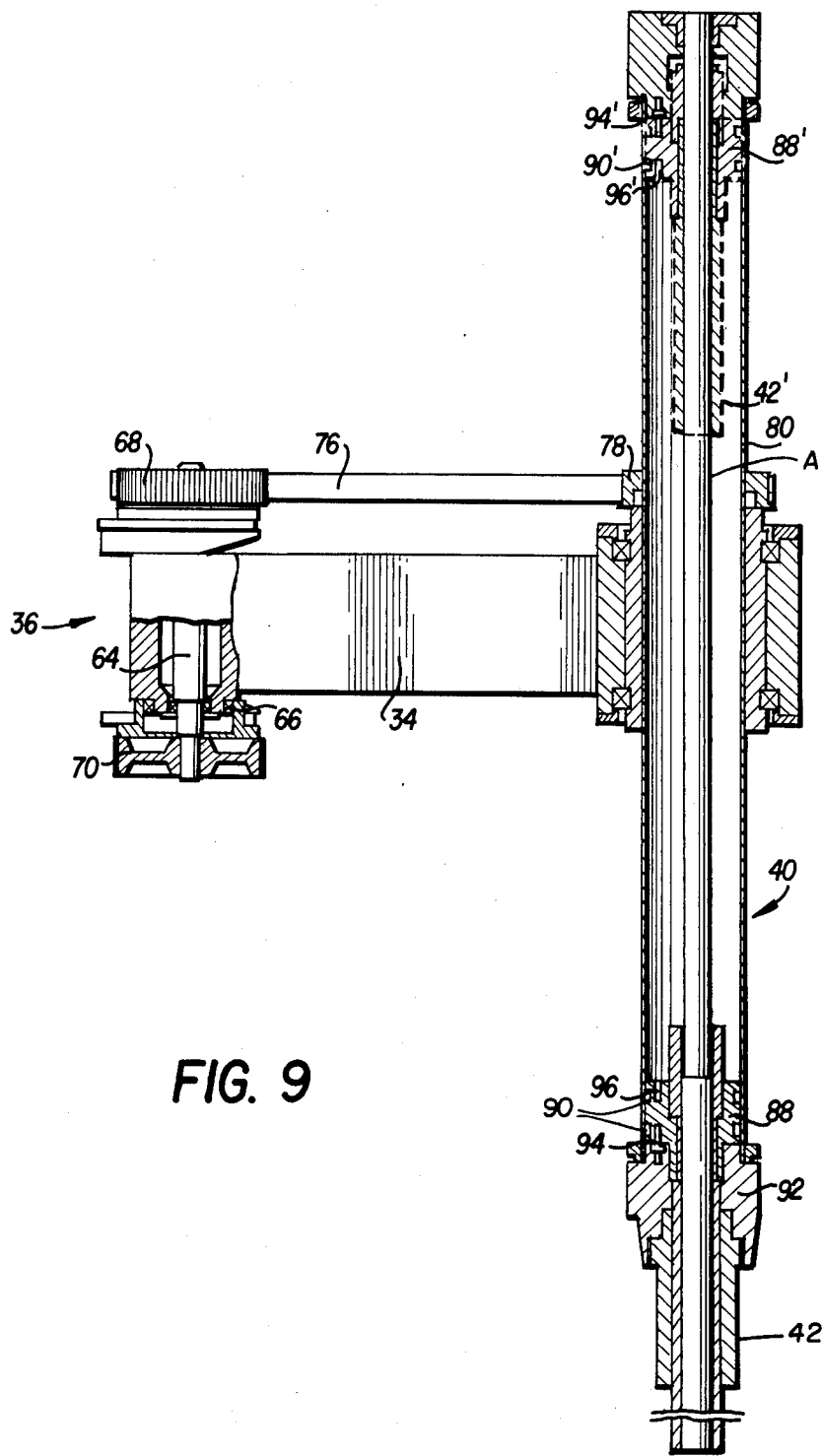
FIG. 9 is a sectional view through the forearm and the vertical transfer jack along line IX—IX shown in FIG. 2.

Swivel link (36) of the articulated system has a free-turning spindle (64; FIG. 2) onto which arms (26,34) are mounted by means of ball-bearings (66; FIG. 9). A pair of sheaves or gear-wheels (68,70) is permanently mounted at opposite ends of the vertical loose spindle (64), lower gear-wheel (70) co-operating with an endless belt (72) mounted on another fast gear-wheel (74) attached to casing (55) of reducer $R_2$. The upper gear-wheel (68) of spindle (64) is linked in similar fashion by drive belt (76) to a gear-wheel (78) fixed coaxially about cylinder (80) of the first vertical transfer jack (40). The four gear-wheels (74,70; 68, 78) have all the same outer diameter and a belt-tightener (82,84) equips each notched belt (72,76) to ensure the appropriate tension. The angular position of forearm (34) relative to arm (26) is thus maintained while spindle (28) pivots due to the rotation of the first servo-motor $M_1$, the other servo-motor $M_2$ remaining stationary. As shown on FIG. 5, when servo-motor $M_1$ is not rotating, angle D between forearm (34) and main arm can vary from 45 to 135 degrees depending on the pivot angle C of forearm (34) under the effect of the rotation of the second servo-motor $M_2$. The circular trajectory $T_1$ of swivel link (36) during the angular travel B of arm (26) lies within an annular sector (38) swept by the articulated system. This sector (38) is delimited by two concentric circular arcs $T_2$, $T_3$, having as center spindle (28) and tracing the trajectories of jack (40) for the extreme values of angle C of forearm (34). In an alternative version (not illustrated) gear-wheel (74) may be of the rotating instead of stationary type.

With reference to FIG. 9, the drive rod (42) of vertical transfer pneumatic jack (40) can translate between two limiting positions and is offset radially or eccentric in relation to the axis of piston (88) attached to rod (42). Piston (88) slides sealtight by means of seals (90) inside cylinder (80) fitted on body (92). The piston 88 slides between upper and lower positions along a central axial pin A which is fixed to the top of the tube 80. The piston 88 which carries the drive rod 42 is shown in solid lines at its lower position in FIG. 9 and in dashed lines in the upper position. The length of rod 42 is partially shown in FIG. 9 and the external end of rod 42 is mechanically connected to the tool holder 43 (FIG. 2). The offcentering or eccentricity of rod (42) relative to piston 88 constitutes an aspect of an anti-rotation guide which ensures that the position of body (92) relative to rod (42) of jack (40) is maintained during the rotating motions of arms (26,34) of manipulator (12). The anti-rotation guide also includes at each end of body (92) of jack (40), centering pawls (94) which, at the end of travel of the jack fit into slots (96) provided in the mobile piston (88). The insertion of pawls (94) into the corresponding slots (96) ensures mechanical positioning of rod 42 relative to body 92 and completes positioning and guiding of linear travel of rod (42) at the end of the stroke of jack (40). The engagement of pawls 94 and slots 96 locks the rod 42 to the body 92 during rotation of arms 26, 34 and relieves the load on seals (90) of mobile piston (88). Plastic is a suitable material for stationary cylinder (80) of jack (40).

Tool-holder (43; FIG. 2) is provided with a releasable coupling (100) with a memory device, designed to permit, on the one hand, the momentary disconnection of tool (44) from tool-holder (43) in the event of abnormal loads and, on the other hand, the automatic return of tool (44) to its start-of-work position at the end of the operation. Coupling (100) shown in detail in FIG. 10, has a drive tube (102) one end of which attached to tool-holder (43) driven by rod (42), and has the form of a socket joint (106a) co-operating with a first bolt (104a). The other end of tube (102) forms a housing for a second socket joint (106b) associated with a second bolt (104b). Each bolt (104a,104b) consists of a check ball or check roller able to take a blocking position inside a cavity in the corresponding ball of the socket joint. The structure of each socket joint (106a,106b) offers two degrees of freedom in rotation, one degree having been eliminated. Socket joints (106a,106b) may be conveniently replaced by cardan joints. A drive rod (108) designed to block the second socket joint (106b) and to release the first socket joint (106a) is placed axially inside drive tube (102) between the two bolts (104a, 104b). The assembly of socket joint (106a) along with bolt (104a) is housed in a stationary body (110) enclosing an inner volume (112) controlling the releasable coupling (100). In the example shown, the blocking control system is pneumatic and volume (112) is subdivided into two elementary spaces for a flexible wall having a central washer (116). The bottom surface of actuating washer (116) bears against bolt (104a) facing rod (108) and the top surface is fixed to a position transmitter (118) acting on two sets of contacts (120a,120b) operating in reverse and connected electrically to controller (14). A compression spring (122) fitted in an axial groove in the body of socket joint (106b) pushes bolt (104b) upwards against the blocking force transmitted by rod (108). The blocking system may be hydraulically or mechanically operated instead of pneumatically controlled.

Figure 10:
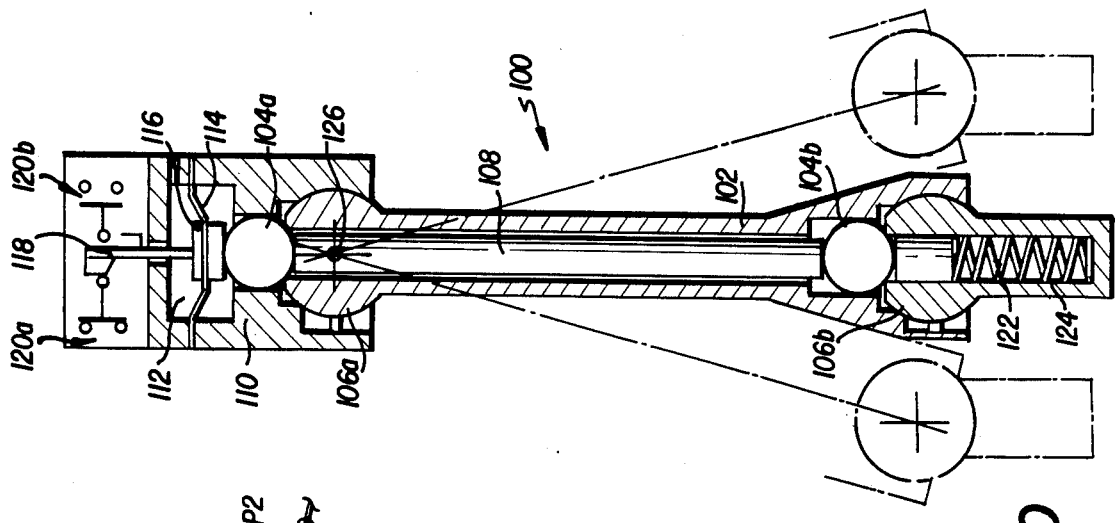
FIG. 10 illustrates the releasable coupling with memory device.

The releasable couping (100) operates in the following way:

In the normal locking position of coupling (100), shown in bold lines on FIG. 10, drive tube (102) takes up a central equilibrium position in which the pneumatic pressure inside volume (112) generates a vertical downward force bringing the first bolt (104a) into blocking position in the cavity of the ball of socket joint (106a). The blocking force is transmitted by rod (108) to the second bolt (104b) which ensures locking of lower socket joint (106b). The two socket joints (106a,106b) are in blocked position thereby forming a rigid connection between tool-holder (43) and tool (44). The set of contacts (120a) is closed permitting the operation of the cycle governed by controller (14).

In the event of abnormal loads endangering the mould, coupling (100) acts as a load limiter by ensuring the momentary release of the connection by unlocking bolt (104b) which slightly disengages from the cavity in the ball of socket joint (106b). Simultaneously, rod (108) transmits the unblocking command to the first bolt (104a) and the two socket joints (106a,106b) are consequently freed. Tube (102) can now swivel about point (126) breaking the connection. When a return force is applied on the bolts, coupling (100) returns to its central equilibrium position.

In the last position, unlocking of coupling (100) is achieved automatically once the pneumatic pressure in volume (112) departs, causing unblocking of bolts (104a,104b). The opposing force of spring (122) keeps socket joints (106a,106b) of coupling (100) in the released position. Controller (14) can be stopped by closing the set of safety contacts (120b).

All the successive operations in the operating cycle of robot (10) will not be described in detail. It can simply be noted on FIGS. 1 and 4 that the removal trajectory in the mould stripping cycle is linear over a travel distance of 150 mm having its origin at pick-up point (16). Angle A formed by this trajectory with the stripping plane is defined in an instruction given in the program of controller (14). The linearity of the stripping travel is the result of the coordination of the two servo-controlled rotary motions of the arms (26,34) of manipulator (12). At the end of the removal travel, the part is lifted by means of the vertical translation of jack (40) to its upper position. After this operation the part is transferred to the intermediate work area (drilling, flash and sprue removal) the transfer trajectory of the robot's terminal component being determined by learning through the servo-controlled rotation of arms (26,34). The cycle continues with the part unloading phase following an optimized unloading trajectory that is organized in accordance with palettes (24) of conveyor (22). The second swing-over rotating jack (46) causes pick-up tool (44) to pivot 90 degrees when the unloading point is reached, and the part is finally unloaded by lowering of the first jack (40) to the lower position. At the end of the unloading operation, the first jack (40) rises to the upper position followed by the return of robot (10) directly to the mould without going through intermediate area (18).

Figure 12:
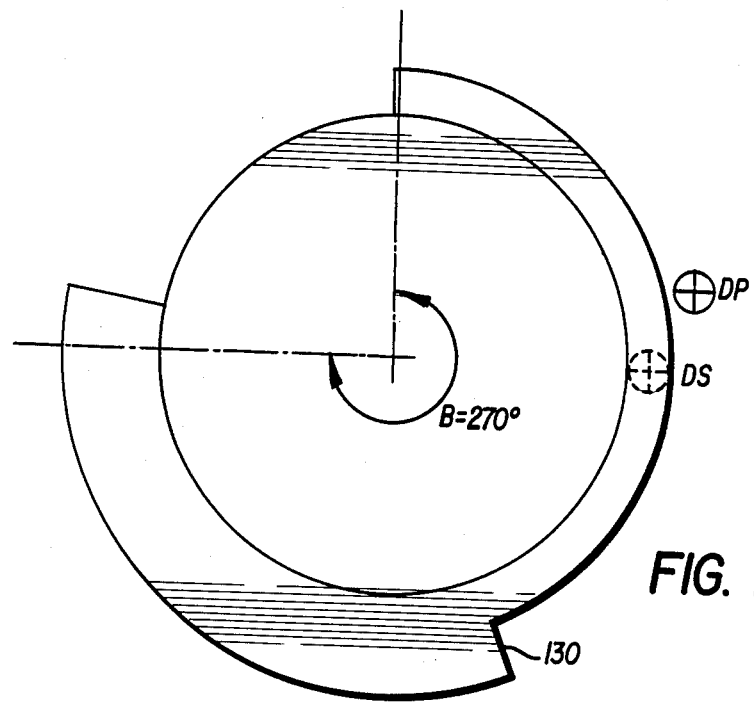
FIGS. 12 and 13 show the position of the proximity detectors at each swivel joint of the arms.
Figure 13:
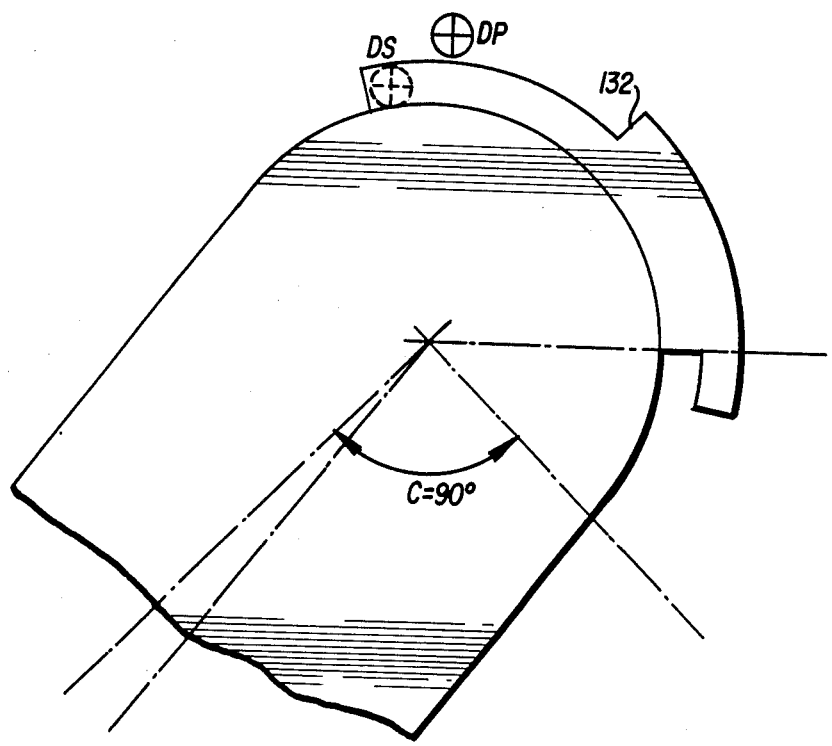

On FIG. 11 showing the diagram of electrical connections of robot (10) to the inputs and outputs of programmable controller (14), each link (28,36) of each arm (26,34) driven by servo-motors $M_1, M_2$, is equipped with a pair of arm positioning and safety detectors DP and DS. These detectors DP and DS may be composed for instance of electromagnetic on-off components placed at a predetermined location on the angular travel B,C of the corresponding arm (26,34). (See FIGS. 12 and 13).

When servo-motors $M_1,M_2$ revolve, the change of state of detectors DP and DS is brought about by the edge (130,132) of a moving metal sector which causes an electric contact to open or close. The two incremental coders $CP_1$ and $CP_2$ are connected to controller (14) by conductors (134,136) and servo-motors $M_1,M_2$ are supplied by power circuits (138,140). The first vertical transfer pneumatic jack (40) has a coil (142) driving it to the lower position, and a coil (144) driving it to the upper position, each coil being excited respectively by conductors (146) and (148) under the control of controller (14). The travel of jack (40) is delimited by an upper limit switch FCH and a lower limit switch FCB. The second pneumatic jack (46) that swings tool (44) is driven by coil (150) excited by conductor (152) under the control of controller (14). All the position detectors, DP, safety detectors, DS, and jack limit switches are connected to controller (14) by conducting wires.

A transitory cycle to readjust arms (26,34) to their starting position takes place in the following circumstances:
  the first time the robot is switched on;
  if the power is cut off during an accelerated movement of the arms; and
  if an accidental maladjustment is detected by the monitoring program.

Each incremental coder $CP_1,CP_2$, of the angular position of servo-motors $M_1,M_2$, is bidirectional with a zero position index giving a signal as shown on FIG. 14b. Each incremental coder $CP_1,CP_2$ delivers a zero position signal on each revolution of the corresponding servo-motor $M_1,M_2$. On-off position detector DP, provided at each swivel link (28,36) changes state (FIG. 14a) near the middle of the angular travel B,C of its corresponding arm (26,34). The status of position detector DP informs controller (14) if arm (26) or (34) is on the lefthand side or the righthand side of the midpoint. When the initial position of the arm is at $E_1$, in the lefthand zone (FIG. 14e) the corresponding position detector is in one condition. The position detector is in zero condition when the initial position of the arm is in the righthand zone (for instance, position $E_2$).

Figure 15:
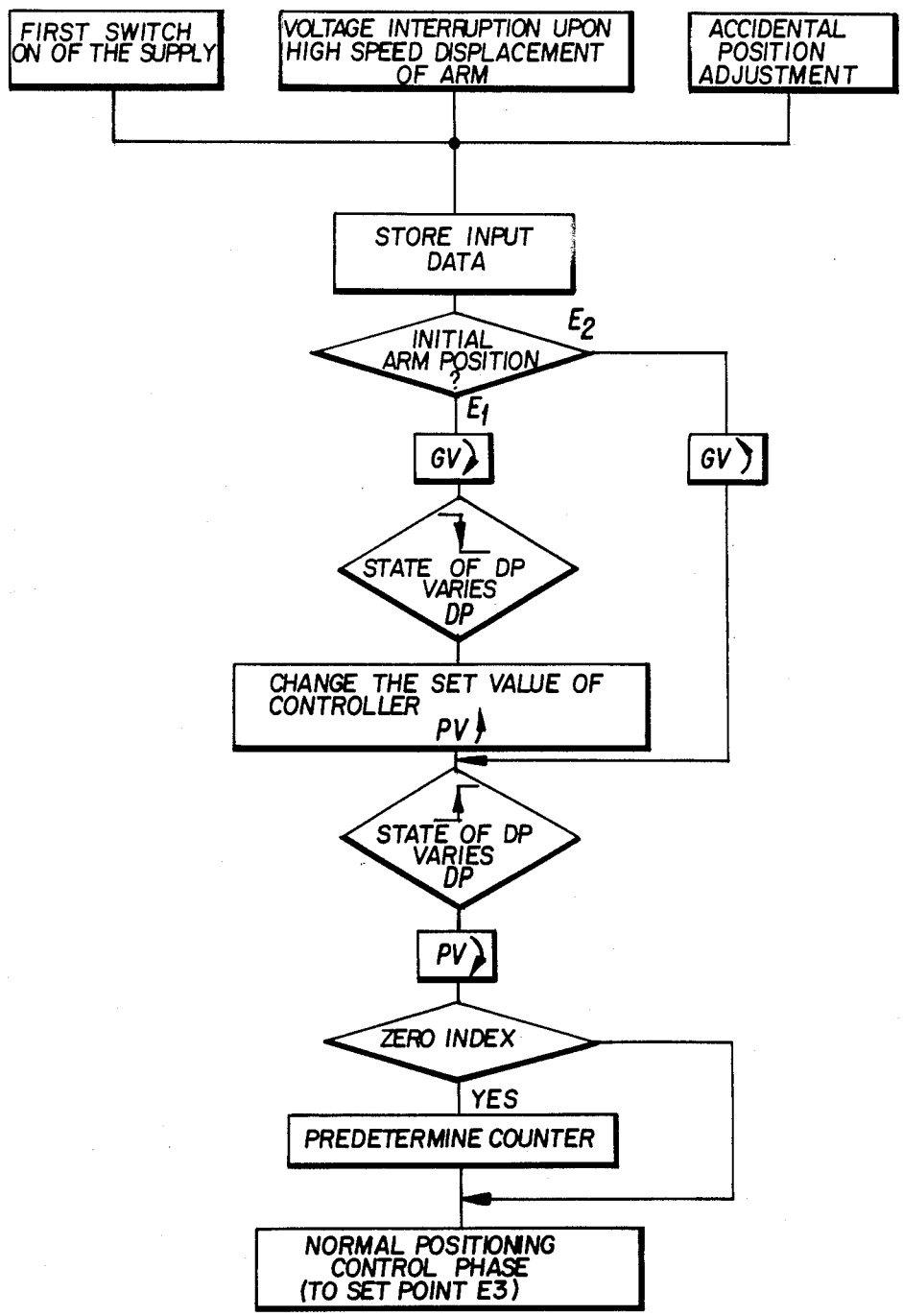

The arm readjustment kinematics depending on the initial position of the arm is illustrated in the diagram FIG. 14e and flowchart FIG. 15. The flowchart is the same for main arm (26) and forearm (34). In the following the operation is described with reference to arm (26) driven by servo-motor $M_1$. When the initial position of arm (26) is on the left, (point $E_1$), the set value of controller (14) acts on the speed control loop to drive servo-motor $M_1$ at high speed (GV) in a given direction (e.g. clockwise). As soon as position detector DP changes state (from one to zero) due to the effect of edge (130), the controller set value is altered and results in rotation of servo-motor $M_1$ in the reverse direction at slow speed (PV), starting from a first checkpoint located on the righthand side near the midpoint. The position of this first checkpoint will depend on the inertia of the arm, and the reverse rotation at reduced speed (PV) will continue until the position detector DP again changes state (from zero to one). This occurs at the second checkpoint on the lefthand side near the midpoint, and causes the set value of the controller to be altered, entailing a reversal of the direction of rotation of servo-motor $M_1$ to determine the zero position index of the incremental coder $CP_1$. To find the first zero position signal after the change of state of the position detector DP, the servo-motor is rotated at reduced speed (PV) always in the same direction (clockwise), whatever the initial position ($E_1$ or $E_2$) of arm (26). This zero signal corresponds to a precise mechanical position of servo-motor $M_1$. When the initial position of arm (26) is on the righthand side (point $E_2$) the zero condition of position detector DP acts on the speed control loop of the controller to cause the anti-clockwise rotation of servo-motor $M_1$ at high speed (GV) until a checkpoint is reached on the lefthand side near the midpoint. The change of state (from zero to one) of the position detector DP then causes the set value of the controller to be altered, entailing reversal of the direction of rotation (at reduced speed) of servo-motor $M_1$ to find the zero signal. Whatever the initial position of arm (26) the position detector DP determines the zone of this initial position (on the left or on the right) and the counter representing the position is then reset on the first zero position signal (PTO) that occurs after the change of state of position detector DP. This sequence of readjustment to starting position is transitory and is followed immediately by the positioning closed loop control phase (positioning by increments up to set point $E_3$).

The invention is naturally in no way restricted to the embodiment described more specifically herein and illustrated on the attached drawings, but, on the contrary, covers any other alternative embodiment featuring equivalent systems.

What is claimed is:
1. An industrial robot equipped with an articulated manipulator having a main arm rotatable relative to a stationary housing and coupled mechanically to a forearm attached to a gripping component, and controlled by a programmable controller directing and monitoring the robot's operating cycle, the manipulator having a kinematic system comprising:
  a first means for vertical transfer provided between said gripping component and the free end of said forearm,
  a swivel link between the main arm and the forearm, comprising a first vertical free-turning, loose spindle onto which said main arm and forearm are mounted by means of ballbearings,
  a second vertical spindle rotatably supported in the stationary housing and fixedly supporting said main arm and lying parallel to said first loose spindle of said swivel link in such a way that both main and forearms pivot in a fixed horizontal plane to constitute a kinematic system functioning in cylindrical coordinates,
  a first servo-motor for driving said main arm in rotation around said second spindle,
  a second servo-motor for driving said forearm in rotation around said first spindle,
  an auxiliary transmission to transmit the movement of said main arm and forearm, and composed of a pair of first and second gear-wheels fixed permanently at opposite ends of said first loose spindle of said swivel link and co-operating respectively with a pair of first and second endless drive belts lying respectively in the direction of the forearm and the main arm,
  said first belt being wound between said first gear-wheel and a third gear-wheel fixed to said first means for vertical transfer,
  said second belt wound between said opposite second gear-wheel on said first spindle and a fourth gear-wheel mounted coaxially on the second supporting spindle and fixed to said housing, and programming means co-operating with said servo-motors for coordinating the two servo-controlled rotating motions of said main arm and forearm so as to drive the gripping component through a linear trajectory at the beginning of the robot's operating cycle.

2. An industrial robot according to claim 1, wherein said first, second, third and fourth gear-wheels have approximately the same outer diameter.

3. An industrial robot according to claim 1, wherein said second servo-motor is supported by a fastening lug attached to said second spindle, and is coupled to said forearm by means of a reducing gear mechanism ($R_3$) composed of a ball-mounted drive screw extending parallel to said main arm.

4. An industrial robot according to claim 1, wherein said first means for vertical transfer comprises a first jack having a movable piston cooperating with a driving rod moving in either direction of linear travel F between two pre-set upper and lower end positions, said driving rod of said jack being radially offset with respect to the axis of said piston so as to form an anti-rotation guide system.

5. An industrial robot according to claim 4, wherein said driving rod of said first jack is coupled mechanically to a tool-holder of said gripping component and wherein a second jack cooperates with said gripping component which is mounted about a horizontal spindle of said tool-holder which is further associated with a releasable coupling system in order to ensure the momentary disconnection of the gripping component from said tool-holder in the event of abnormal load.

* * * * *